United States Patent [19]
Peczalski

[11] Patent Number: 4,991,920
[45] Date of Patent: Feb. 12, 1991

[54] OPTICAL CONVERTER

[76] Inventor: Andrzej Peczalski, 9000 Cherokee Dr., Brooklyn Park, Minn. 55428

[21] Appl. No.: 290,072

[22] Filed: Dec. 27, 1988

[51] Int. Cl.[5] .................... H03M 1/12; H03M 7/16
[52] U.S. Cl. ................................. 350/96.14; 341/97; 341/137; 350/96.11
[58] Field of Search ................... 341/13, 14, 97, 98, 341/137; 350/96.11, 96.14, 96.3

[56] References Cited

U.S. PATENT DOCUMENTS

| H353 | 10/1987 | Taylor | 341/137 |
|---|---|---|---|
| 4,055,841 | 10/1977 | Crawford . | |
| 4,058,722 | 11/1977 | Taylor | 350/96.14 |
| 4,325,603 | 4/1982 | Marom | 341/137 |
| 4,443,788 | 4/1984 | Breslow . | |
| 4,445,110 | 4/1984 | Breslow . | |
| 4,502,037 | 2/1985 | LeParquier et al. | 341/137 |
| 4,545,078 | 10/1985 | Wiedeburg | 350/96.14 |
| 4,608,682 | 8/1986 | Nagashima et al. | 350/96.14 |
| 4,685,763 | 8/1987 | Tada et al. | 350/96.11 |

Primary Examiner—William M. Shoop, Jr.
Assistant Examiner—Gary J. Romano
Attorney, Agent, or Firm—John G. Shudy, Jr.

[57] ABSTRACT

A very high speed optical converter for converting digital signals from Gray code to binary code and vice versa. The converter implements an exclusive-OR function. The converter may be constructed with fiber optic technology, AlGaAs ridge waveguide technology, LiNbO technology and other technologies.

20 Claims, 4 Drawing Sheets

| DECIMAL | GRAY CODE | | | | BINARY CODE | | | |
|---|---|---|---|---|---|---|---|---|
| | $G_0$ | $G_1$ | $G_2$ | $G_3$ | $B_0$ | $B_1$ | $B_2$ | $B_3$ |
| 0  | 0 | 0 | 0 | 0 | 0 | 0 | 0 | 0 |
| 1  | 0 | 0 | 0 | 1 | 0 | 0 | 0 | 1 |
| 2  | 0 | 0 | 1 | 1 | 0 | 0 | 1 | 0 |
| 3  | 0 | 0 | 1 | 0 | 0 | 0 | 1 | 1 |
| 4  | 0 | 1 | 1 | 0 | 0 | 1 | 0 | 0 |
| 5  | 0 | 1 | 1 | 1 | 0 | 1 | 0 | 1 |
| 6  | 0 | 1 | 0 | 1 | 0 | 1 | 1 | 0 |
| 7  | 0 | 1 | 0 | 0 | 0 | 1 | 1 | 1 |
| 8  | 1 | 1 | 0 | 0 | 1 | 0 | 0 | 0 |
| 9  | 1 | 1 | 0 | 1 | 1 | 0 | 0 | 1 |
| 10 | 1 | 1 | 1 | 1 | 1 | 0 | 1 | 0 |
| 11 | 1 | 1 | 1 | 0 | 1 | 0 | 1 | 1 |
| 12 | 1 | 0 | 1 | 0 | 1 | 1 | 0 | 0 |
| 13 | 1 | 0 | 1 | 1 | 1 | 1 | 0 | 1 |
| 14 | 1 | 0 | 0 | 1 | 1 | 1 | 1 | 0 |
| 15 | 1 | 0 | 0 | 0 | 1 | 1 | 1 | 1 |

*Fig. 1*

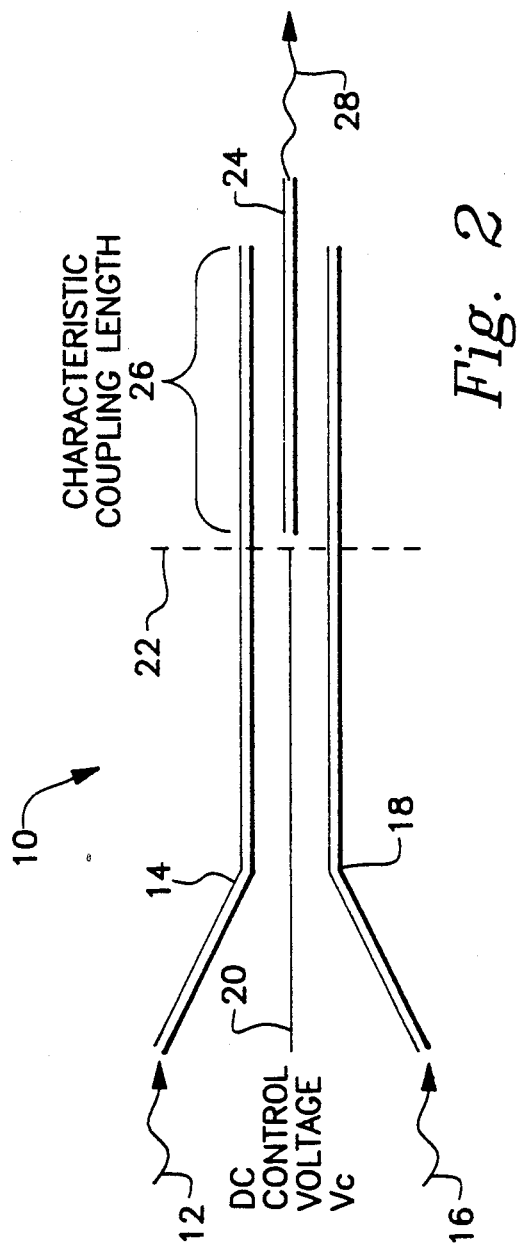

OPTICAL CONVERTER

BACKGROUND OF THE INVENTION

The present invention pertains to optical translators and particularly to Gray to binary code optical converters. More particularly, the invention pertains to very high speed Gray to binary code optical converters for translation of signals from a first Gray code to a second binary code and vice versa.

Binary code representation of information signals is well known in the art. Two widely used codes are the conventional binary code and the reflected binary code which is also referred to as Gray code. Both the binary and Gray codes are often translated to the other for advantageous reasons in signal processing. Gray code is greatly favored because a single bit reversal (i.e., a bit error does not result in a large quantitative error).

The conversion of signals from the Gray (G) code to binary (B) code may be expressed as $B_0 = G_0$ and $B_n = G_n \oplus B_{n-1}$ for $n \geq 1$, $G_n = B_n \oplus B_{u-1}$ for $n \geq 1$ where "$\oplus$" is an exclusive-OR function, "0" is the most significant bit, and as n increases the bit becomes less significant.

FIG. 1 is a truth table showing decimal numbers and corresponding four bit Gray and binary codes. Various approaches have been developed for translating signals from one code to another. One approach has been to use digital logic techniques including the exclusive-OR logic function to implement the translations. Various other cumbersome techniques, including quasi-optical circuitry, incorporating the exclusive-OR function, have been used for translating from one code to the other. None resembles the present invention.

SUMMARY OF THE INVENTION

The present invention is an elegant and extremely high speed (i.e., hundreds of gigahertz) Gray to code translator incorporating the exclusive-OR function. The basic invention is a translator or decoder wherein both the input and output signals are purely optical. There is no electronic translation or conversion of signals within the converter. The invention is, besides others, a basis for an optical analog-to-digital (A/D) converter which inherently generates a Gray-coded digital signal. The invention is also a basis for a digital-to-analog (D/A) converter. Many other circuits may implement the present invention to attain the advantages of speed and refinement.

BRIEF DESCRIPTION OF THE DRAWINGS

FIG. 1 is a four-bit Gray-to-binary code truth table.

FIG. 2 illustrates a basic optical converter of the present invention.

FIG. 3 is an exclusive-OR truth table corresponding to the inputs and output of the optical converter in FIG. 2.

DESCRIPTION OF THE PREFERRED EMBODIMENTS

Figure 4:
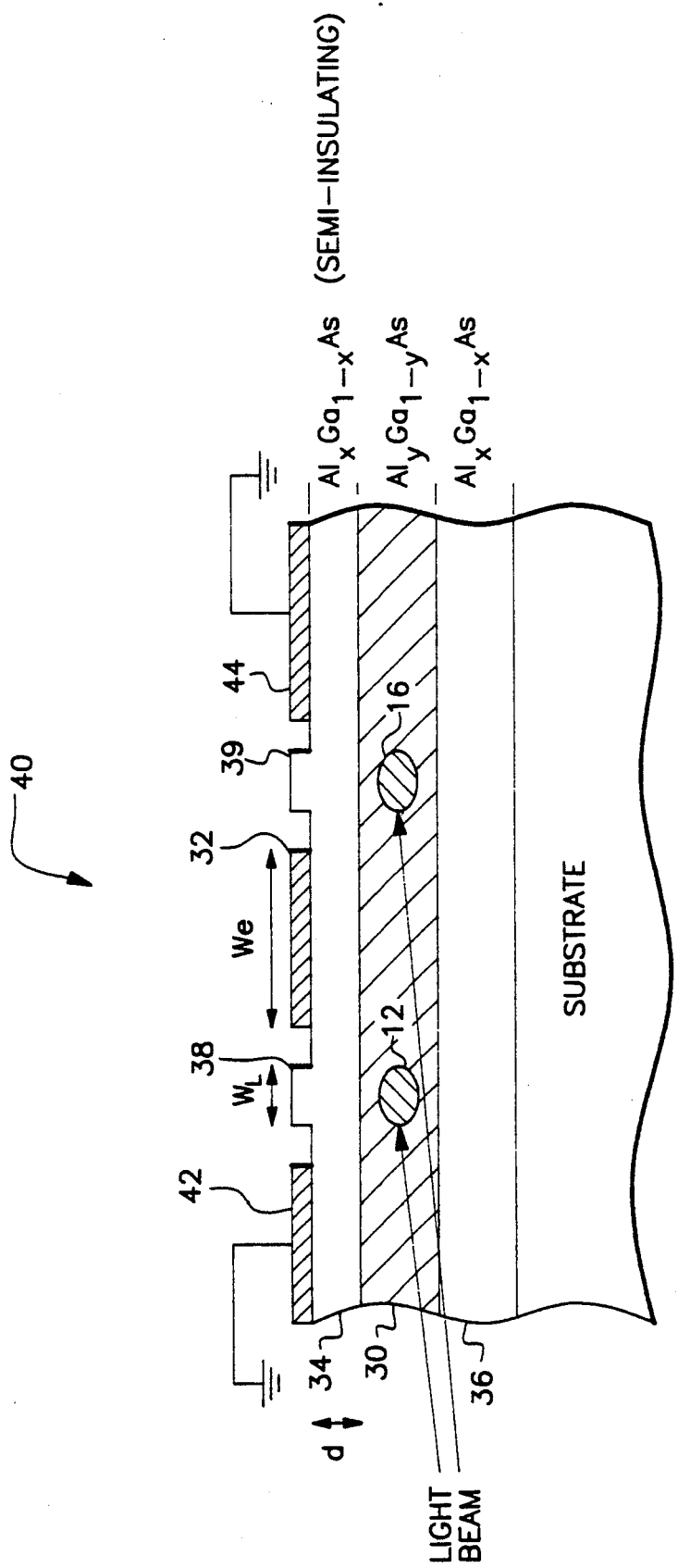
FIG. 4 is a monolithic integrated circuit embodiment of the converter in FIG. 2.

FIG. 2 reveals exclusive-OR optical circuit 10. Light signal 12 enters light waveguide or light guide 14, and light signal 16 enters light waveguide or light guide 18 of circuit 10. Light signals 12 and 16 are in phase and have preferably the same amplitudes. The relative amplitudes of signals 12 and 16 are adjustable. Conductor 20 is positioned preferably equidistant from light guides 14 and 18. Conductor 20 may be physically next to light guides 14 and 18. A direct current (DC) control voltage ($V_c$) of up to about 10 volts, is applied to conductor 20. Due to the DC voltage, conductor 20 radiates an electric field that affects or shifts the phases of incoming light signals 12 and 16. The electro-optical effects on signals 12 and 16 are opposite-acting such that, as signals 12 and 16 move down light guides 14 and 18, respectively, signals 12 and 16 eventually become 180 degrees ($\pi$ or an odd multiple of $\pi$) out of phase with each other, whereat the length of conductor 20 terminates at dimension line 22 in FIG. 2. The coupling length of conductor 20 and light guides 14 and 18 is in the millimeter range, e.g., 3 millimeters. DC voltage $V_c$ may be adjusted so that the phases of signals are 180 degrees out of phase when reaching line 22. Beyond conductor 20 and line 22, the phases of light signals 12 and 16 do not change (i.e., signals 12 and 16 remain 180 degrees out of phase), as signals 12 and 16 travel on down guides 14 and 18, respectively. Positioned between light guides 14 and 18 is light guide 24. Guide 24 is preferably equidistant from guides 14 and 18. Guide 24 may be physically next to light guides 14 and 18. Guides 14 and 18 are effectively optically coupled to guide 24. FIG. 2 shows guides 14, 18 and 24 lying parallel and proximate to one another to effect the optical coupling. The coupling length or region 26 of light guide 24 and light guides 14 and 18 is again in the millimeter range, e.g., 3 millimeters. Output 26 is the resultant light coupled from guides 14 and 18. If light signals 12 and 16 are the same magnitude and out of phase at coupling region 26, light signals coupled into guide 24 will cancel each other and output 28 will be zero in magnitude. If only one guide, 14 or 18, is transmitting a light signal, 12 or 16, respectively, then output 28 will have a signal representative of signal 12 or 16, respectively. The exclusive-OR truth table of FIG. 3 reveals the relationship of input signals 12 and 16 to output signal 28, where "0" represents no light signal and "1" represents a light signal. Note that exclusive-OR optical-switched coupler 10 has no electro-optical or optical-electric conversion or translation of signals from the inputs to the output.

Device 10 may be implemented with light guides constructed from a variety of materials in different ways. Optical fibers, semi-insulating materials or mere refractive or reflective optical control of the light signals may be used to construct and/or implement the invention. Monolithic semiconductor integrated circuit 40 of integrated optics may incorporate device 10. FIG. 10 reveals a cross-sectional view a monolithic construction of device 10, which is a symmetric coplanar traveling wave electrode 32 deposited on a structure made of ridge light guides. Light signals 12 and 16 may be fed into $Al_yGa_{1-y}As$ material 30 with pigtail attached laser diodes or optical fibers. Signals 12 and 16 are constrained in material 30. Vertical constriction of signals 12 and 16 is accomplished with $Al_xGa_{1-x}As$ semi-insulating materials 34 and 36 having a different refractive index than that of material 30. Also ridges 38 and 39 constrain light signals or beams 12 and 16, respectively, due to the greater overall thickness of material 34 than thickness d of material 30 at other areas, and cause the light beams to remain below material 30 directly under ridges 38 and 39. The edges of light beams 12 and 16 align approximately with ridge widths $W_L$ of ridges 38 and 39.

Electrode 32, having a width $W_e$ carries DC control voltage $V_c$ and exhibits an electric field in conjunction with grounded electrodes 42 and 44 thereby affecting the phase relationship of signals 12 and 16 in the same manner as electrode 20 in FIG. 2. The symmetric coplanar line, as traveling wave electrode 32 and electrodes 42 and 44, causes opposite phase shift in light beams 12 and 16. Electrodes 32, 42 and 44 terminate at a point where light beams 12 and 16 are 180 degrees out of phase. The beams 12 and 16 are coupled into one output having an exclusive "OR" function of light beams 12 and 16. Ridges 38 and 39 of structure 40 correspond to waveguides 14 and 18 of structure 10, respectively. Device 10 may also be fabricated in LiNbO ridge waveguide technology like that of the above-described AlGaAs ridge waveguide technology.

Figure 5:
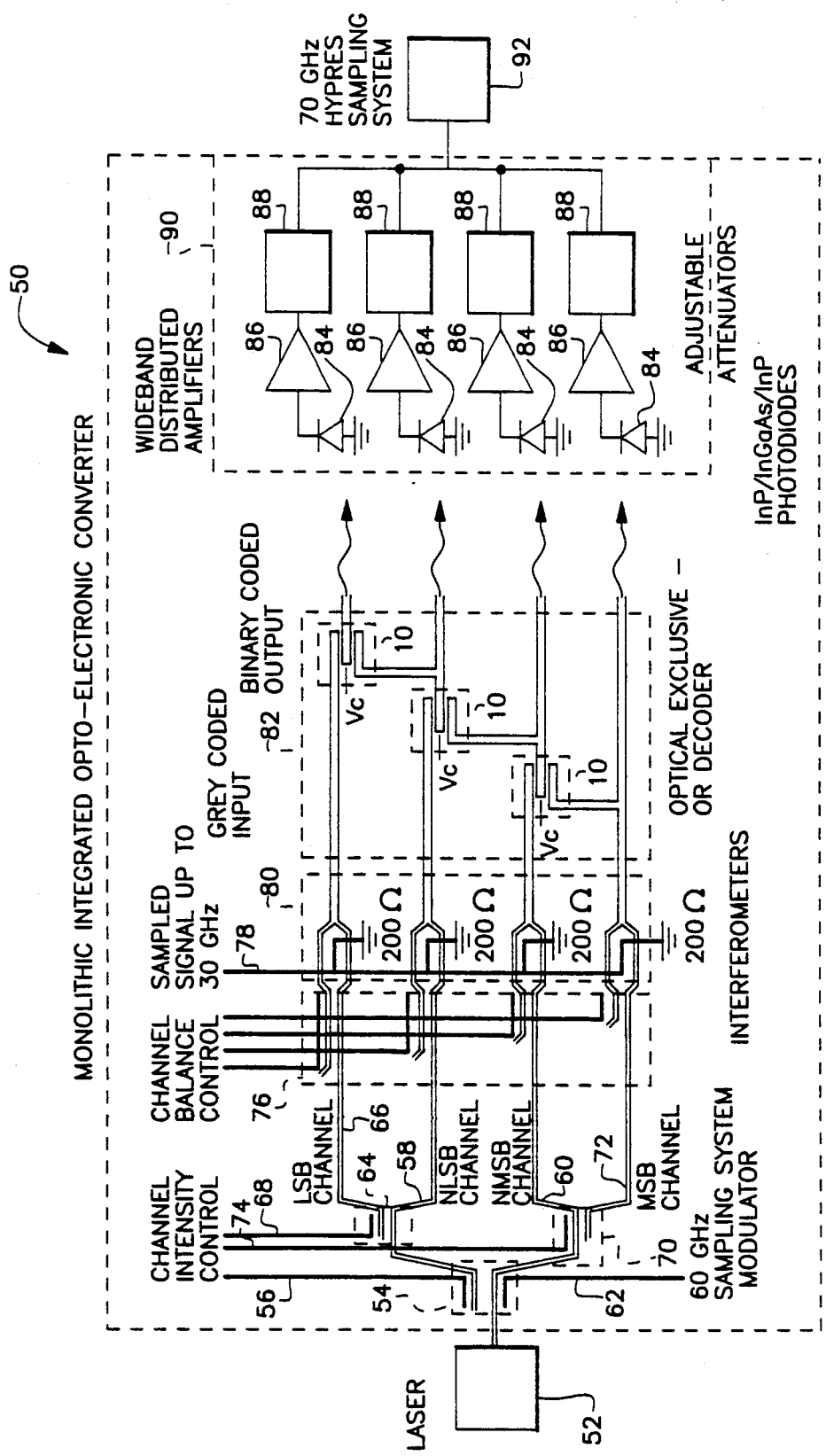
FIG. 5 is a schematic of a monolithic integrated opto-electronic converter.

FIG. 5 is a schematic of a monolithic opto-electronic converter incorporating device 10. Laser 52 puts out a light signal to 3 decibel (dB) coupler 54 which evenly splits the signal to light guides 58 and 60, respectively, representing the next least significant bit and the next most significant bit. Channel intensity control 56 is a DC voltage that fine-adjusts the splitting function of coupler 54 so that signals of equal intensity go to light guides 58 and 60. Line 62 carries a 60 GHz signal to coupler 54 and modulates the light signals on guides 58 and 60. The coupling of line 62 to coupler 54 needs to be such that there is a match of the electrical and optical velocities so that there is a minimum signal walk-off. The modulated light signal on guide 58 goes to 3 dB coupler 64 which splits the signal into two equal signals, one of which is sent on down guide 58 representing the next least significant bit channel and the other on down guide 66 representing the least significant bit channel. Intensity control 68 adjusts coupler 64 so that the signal is evenly split. The signal to coupler 70 is split into two signals, one of which that goes down guide 60 of the next most significant bit channel and the other down guide 72 representing the most significant bit channel. Intensity control 74 fine adjusts coupler 70.

Channel balance control 76 is for fine adjusting the splitting of modulated laser signals for each of the inputs or arms of Mach-Zender interferometers forming A/D converter 80. A sampled analog signal up to 30 GHz is brought in on line 78 to A/D converter 80 having an interferometer, such as a Mach-Zehnder interferometer, for each of the four bit channels. The elements of each interferometer are balanced for velocity matching of the electrical and light signals. Converter 80 converts the sampled analog signals from line 78 into digital signals. The output of converter 80 is a Gray coded output that goes on to the optical Gray-to-binary translator 82 comprising three devices 10 as illustrated in FIG. 2. The optical signal outputs from translator 82 go to high speed InP/InGaAs/InP photodiodes 84 where the optical signals are transformed into electrical signals that are amplified by wideband distributed amplifiers 86. The outputs of amplifiers 86 go to adjustable microwave attenuators 88 whose outputs are connected together to provide an analog output. Translator 82 and optical-to-electrical converter 90 combine into a very high speed four-bit D/A converter incorporating Gray-to-binary optical translators. The analog output of converter 90 goes to recipient means 92 which may be a display such as a 70 GHz Hypres sampling system.

I claim:

1. An optical converter comprising:
   first input means for receiving a first light signal;
   first light guide means, connected to said first input means, for guiding said first light signal;
   second input means for receiving a second light signal;
   second light guide means, connected to said second input means, for guiding said second light signal;
   phase-shifting means, proximate to said first and second light guide means, for shifting phases of said first and second light signals; and
   summing means, coupled to said first and second light guide means, for summing the first and second light signals.

2. Apparatus of claim 1 wherein:
   said phase-shifting means shifts the phases of the first and second light signals so that the first and second light signals are approximately 180 degrees out of phase relative to each other; and
   said summing means results in a near zero output due to mutual cancellation of the out-of-phase first and second signals only when both the first and second light signals are present on said first and second light guide means, respectively, and a signal output when only the first or only the second light signal is present on said first or second light guide means, respectively.

3. Apparatus of claim 2 wherein:
   said first and second light guide means are fabricated first and second light guides, respectively, in integrated opto-electronic technology;
   said phase-shifting means is a light phase-shifting electrode deposited proximate to said light guides in co-planar geometry of the integrated opto-electronic technology; and
   said summing means is a third light guide coupled to said first and second light guides, fabricated in integrated opto-electronic technology.

4. Apparatus of claim 3 wherein said light guides are fabricated in AlGaAs ridge waveguide technology.

5. Apparatus of claim 3 wherein said light guides are fabrication LiNbO ridge waveguide technology.

6. Apparatus of claim 2 wherein:
   said first light guide means is a first optic fiber;
   said second light guide means is second optic fiber;
   said phase-shifting means is an electrode in close proximity to said first and second optic fibers; and
   said summing means is a third optic fiber in close proximity to said first and second optic fibers.

7. Apparatus of claim 6 wherein:
   said electrode is connected to a direct current voltage and said electrode has a particular length of close proximity to said first and second optic fibers such that the phases of in-phase light signals entering said first and second optic fibers, whenever present, to said first and second optic fibers, respectively, are approximately 180 degrees out of phase at the end of the length of said electrode; and said third optic fiber has a particular length in close proximity to said first and second optic fibers beginning at a point where the phases of the light signals in said first and second optic fibers, respectively, are mutually about 180 degrees out of phase, and said third optic fiber continues for the particular length in proximity to portions of said first and second optic fibers where the phases of the light signals in said first and second optic fibers are constantly about 180 degrees out of phase, whenever the light signals are present, and such that the light signals are coupled to said third optic fiber.

8. Apparatus of claim 7 wherein:
the particular length of said electrode in close proximity to said first and second optic fibers, is between 1.0 micrometer and 10 millimeters; and
the particular length of said third optic fiber in close proximity to said first and second optic fibers, is between 1.0 micrometer and 5 millimeters.

9. Apparatus of claim 7 wherein the particular length of said electrode in close proximity to said first and second optic fibers, and the particular length of said third optic fiber in close proximity to said first and second optic fibers, are within twenty per cent of being equal to each other.

10. Apparatus of claim 7 wherein:
the particular length of said electrode in close proximity to said first and second optic fibers, is about 3 millimeters; and
the particular length of said third optic fiber in close proximity to said first and second optic fibers, is about 3 millimeters.

11. Apparatus of claim 2 further comprising:
a first balancing means, connected to said first light guide means, for adjusting intensity of the first light signal; and
a second balancing means, connected to said second light guide means, for adjusting intensity of the second light signal, so that effective intensities of the first and second light signals are equal and cancel out when the first and second light signals are 180 degrees out of phase and are coupled to said third optic fiber.

12. Apparatus of claim 11 wherein said first and second balancing means are voltage-controlled 3 decibel couplers.

13. An optical converter comprising a plurality of interconnected optical translators, for digital-to-digital multi-bit signal translation, wherein each of said plurality of optical translators comprises:
first light guide means for guiding a first light signal, having an input;
second light guide means for guiding a second light signal, having an input;
phase-shifting means for shifting phases of said first and second light signals, wherein said phase-shifting means shifts the phases of the first and second light signals so that the first and second light signals are 180 degrees out of phase relative to each other; and
summing means, coupled to said first and second light guide means, for summing the first and second light signals, wherein said summing means results in a zero output due to mutual cancellation of the output-of-phase first and second signals only when both the first and second light signals are present on said first and second light guide means, respectively, and a signal output when only the first or only the second light signal is present on said first or second light guide means, respectively, and an output of said summing means is connected to an input of another each of said plurality of optical translators.

14. Apparatus of claim 13 further comprising:
a plurality of photodiodes wherein an input of each of said plurality of diodes is optically coupled to an output of said summing means of each of said plurality of translators, respectively;
a plurality of amplifiers wherein an input of each of said plurality of amplifiers is connected to an output of each of said plurality of diodes, respectively;
a plurality of attenuators wherein an input of each of said plurality of attenuators is connected to an output of each of said plurality of amplifiers, respectively; and
an analog output connected to outputs of said plurality of attenuators.

15. Apparatus of claim 13 further comprising:
a plurality of optical interferometers, forming an analog-to-digital converter, wherein each of said plurality of interferometers has an optical output connected to an input of each of said plurality of optical translators, has an input connected to an electrical sampled analog signal, has an electrical balance control signal input, and has at least one optical input;
a first plurality of optical couplers wherein each of said first plurality of optical couplers has at least one optical input, has at least two outputs connected to optical inputs of two interferometers of said plurality of optical interferometers, and has an electrical intensity control input; and
a light input optical coupler having an input connected to a light source, having an electric intensity control input, having a sampling modulator input, and having at least two optical outputs connected to two couplers of said plurality of optical couplers.

16. Apparatus of claim 13 further comprising:
a plurality of optical interferometers, forming an analog-to-digital converter, wherein each of said plurality of interferometers has an optical output connected to an input of each of said plurality of optical translators, has an input connected to an electrical sampled analog signal, has an electrical balance control signal input, and has at least one optical input;
a first plurality of optical couplers wherein each of said first plurality of optical couplers has at least one optical input, has at least two outputs connected to optical inputs of two interferometers of said plurality of optical interferometers, and has an electrical intensity control input; and
a light input optical coupler having an input connected to a light source, having an electric intensity control input, having a sampling modulator input, and having at least two optical outputs connected to two couplers of said plurality of optical couplers;
a plurality of photodiodes wherein an input of each of said plurality of diodes is optically coupled to an output of said summing means of each of said plurality of optical translators, respectively;
a plurality of amplifiers wherein an input of each of said plurality of amplifiers is connected to an output of each of said plurality of diodes, respectively;

a plurality of attenuators wherein an input of each of said plurality of attenuators is connected to an output of each of said plurality of amplifiers, respectively; and an analog output connected to outputs of said plurality of attenuators.

17. An optical converter comprising:
first light guide means for guiding a first light signal;
second light guide means for guiding a second light signal;
phase-shifting means for shifting phases of said first and second light signals; and
summing means, coupled to said first and second light guide means, for summing the first and second light signals; and wherein:
  said phase-shifting means shifts the phases of the first and second light signals so that the first and second light signals are approximately 180 degrees out of phase relative to each other;
  said summing means results in a near zero output due to mutual cancellation of the out-of-phase first and second signals only when both the first and second light signals are present on said first and second light guide means, respectively, and a signal output when only the first or only the second light signal is present on said first or second light guide means, respectively;
  said first light guide means is a first optic fiber;
  said second light guide means is second optic fiber;
  said phase-shifting means is an electrode in close proximity to said first and second optic fibers;
  said summing means is a third optic fiber in close proximity to said first and second optic fibers;
  said electrode is connected to a direct current voltage and said electrode has a particular length of close proximity to said first and second optic fibers such that the phases of in-phase light signals entering said first and second optic fibers, whenever present, to said first and second optic fibers, respectively, are approximately 180 degrees out of phase at the end of the length of said electrode;
  said third optic fiber has a particular length in close proximity to said first and second optic fibers beginning at a point where the phases of the light signals in said first and second optic fibers, respectively, are mutually about 180 degrees out of phase, and said third optic fiber continues for the particular length in proximity to portions of said first and second optic fibers where the phases of the light signals in said first and second optic fibers are constantly about 180 degrees out of phase, whenever the light signals are present, and such that the light signals are coupled to said third optic fiber;
  the particular length of said electrode in close proximity to said first and second optic fibers, is about 3 millimeters; and
  the particular length of said third optic fiber in close proximity to said first and second optic fibers, is about 3 millimeters.

18. An optical converter comprising:
first light guide means for guiding a first light signal;
second light guide means for guiding a second light signal;
phase-shifting means for shifting phases of said first and second light signals; and
summing means, coupled to said first and second light guide means, for summing the first and second light signals; and
wherein:
  said phase-shifting means shifts the phases of the first and second light signals so that the first and second light signals are approximately 180 degrees out of phase relative to each other;
  said summing means results in a near zero output due to mutual cancellation of the out-of-phase first and second signals only when both the first and second light signals are present on said first and second light guide means, respectively, and a signal output when only the first or only the second light signal is present on said first or second light guide means, respectively;
  said first light guide means is a first optic fiber;
  said second light guide means is second optic fiber;
  said phase-shifting means is an electrode in close proximity to said first and second optic fibers;
  said summing means is a third optic fiber in close proximity to said first and second optic fibers;
  said electrode is connected to a direct current voltage and said electrode has a particular length of close proximity to said first and second optic fibers such that the phases of in-phase light signals entering said first and second optic fibers, whenever present, to said first and second optic fibers, respectively, are approximately 180 degrees out of phase at the end of the length of said electrode;
  said third optic fiber has a particular length in close proximity to said first and second optic fibers beginning at a point where the phases of the light signals in said first and second optic fibers, respectively, are mutually about 180 degrees out of phase, and said third optic fiber continues for the particular length in proximity to portions of said first and second optic fibers where the phases of the light signals in said first and second optic fibers are constantly about 180 degrees out of phase, whenever the light signals are present, and such that the light signals are coupled to said third optic fiber;
  the particular length of said electrode in close proximity to said first and second optic fibers, is between 0.5 and 5 millimeters; and
  the particular length of said third optic fiber in close proximity to said first and second optic fibers, is between 0.5 and 5 millimeters.

19. An optical converter comprising:
first light guide means for guiding a first light signal;
second light guide means for guiding a second light signal;
phase-shifting means for shifting phases of said first and second light signals; and
summing means, coupled to said first and second light guide means, for summing the first and second light signals; and
wherein:
  said phase-shifting means shifts the phases of the first and second light signals so that the first and second light signals are approximately 180 degrees out of phase relative to each other;
  said summing means results in a near zero output due to mutual cancellation of the out-of-phase first and second signals only when both the first and second light signals are present on said first and second light guide means, respectively, and a signal output when only the first or only the second light signal is present on said first or second light guide means, respectively;

said first light guide means is a first optic fiber;

said second light guide means is second optic fiber;

said phase-shifting means is an electrode in close proximity to said first and second optic fibers;

said summing means is a third optic fiber in close proximity to said first and second optic fibers;

said electrode is connected to a direct current voltage and said electrode has a particular length of close proximity to said first and second optic fibers such that the phases of in-phase light signals entering said first and second optic fibers, whenever present, to said first and second optic fibers, respectively, are approximately 180 degrees out of phase at the end of the length of said electrode;

said third optic fiber has a particular length in close proximity to said first and second optic fibers beginning at a point where the phases of the light signals in said first and second optic fibers, respectively, are mutually about 180 degrees out of phase, and said third optic fiber continues for the particular length in proximity to portions of said first and second optic fibers where the phases of the light signals in said first and second optic fibers are constantly about 180 degrees out of phase, whenever the light signals are present, and such that the light signals are coupled to said third optic fiber; and the particular length of said electrode in close proximity to said first and second optic fibers, and the particular length of said third optic fiber in close proximity to said first and second optic fibers, are within ten per cent of being equal to each other.

20. An optical converter comprising:

first input means for receiving a first light signal;

first light guide means, connected to said first input means, for guiding said first light signal;

second input means for receiving a second light signal;

second light guide means, connected to said second input means, for guiding said second light signal;

phase-shifting means, proximate to said first and second light guide means, for shifting phases of said first and second light signals; and summing means, coupled to said first and second light guide means, for summing the first and second light signals; and wherein:

said phase-shifting means shifts the phases of the first and second light signals so that the first and second light signals are approximately 180 degrees out of phase relative to each other;

said summing means results in a near zero output due to mutual cancellation of the out-of-phase first and second signals only when both the first and second light signals are present on said first and second light guide means, respectively, and a signal output when only the first or only the second light signal is present on said first or second light guide means, respectively;

said first light guide means is a first optic fiber;

said second light guide means is second optic fiber;

said phase-shifting means is an electrode in close proximity to said first and second optic fibers;

said summing means is a third optic fiber in close proximity to said first and second optic fibers;

said electrode is connected to a direct current voltage and said electrode has a particular length of close proximity to said first and second optic fibers such that the phases of in-phase light signals entering said first and second optic fibers, whenever present, to said first and second optic fibers, respectively, are approximately 180 degrees out of phase at the end of the length of said electrode;

said third optic fiber has a particular length in close proximity to said first and second optic fibers beginning at a point where the phases of the light signals in said first and second optic fibers, respectively, are mutually about 180 degrees out of phase, and said third optic fiber continues for the particular length in proximity to portions of said first and second optic fibers where the phases of the light signals in said first and second optic fibers are constantly about 180 degrees out of phase, whenever the light signals are present, and such that the light signals are coupled to said third optic fiber; and the particular length of said electrode in close proximity to said first and second optic fibers, and the particular length of said third optic fiber in close proximity to said first and second optic fibers, are within fifty per cent of being equal to each other.

* * * * *

UNITED STATES PATENT AND TRADEMARK OFFICE
CERTIFICATE OF CORRECTION

PATENT NO. : 4,991,920
DATED : February 12, 1991
INVENTOR(S) : ANDRZEJ PECZALSKI It is certified that error appears in the above-identified patent and that said Letters Patent is hereby corrected as shown below:

Title Page:
Add Assignee - [73] Honeywell, Inc.-.

Signed and Sealed this

Twenty-seventh Day of October, 1992

Attest:

DOUGLAS B. COMER

*Attesting Officer*  *Acting Commissioner of Patents and Trademarks*